(12) United States Patent
Huldén (10) Patent No.: US 7,248,951 B2
(45) Date of Patent: Jul. 24, 2007

(54) METHOD AND DEVICE FOR DETERMINING POSITION OF AN AUTONOMOUS APPARATUS

(75) Inventor: Jarl Huldén, Solna (SE)

(73) Assignee: Aktiebolaget Electrolux, Stockholm (SE)

( * ) Notice: Subject to any disclaimer, the term of this patent is extended or adjusted under 35 U.S.C. 154(b) by 157 days.

(21) Appl. No.: 10/471,665

(22) PCT Filed: Mar. 7, 2002

(86) PCT No.: PCT/SE02/00420

§ 371 (c)(1),
(2), (4) Date: May 13, 2004

(87) PCT Pub. No.: WO02/075469

PCT Pub. Date: Sep. 26, 2002

(65) Prior Publication Data

US 2004/0193339 A1    Sep. 30, 2004

(30) Foreign Application Priority Data

Mar. 15, 2001   (SE) .................................. 0100925

(51) Int. Cl.
*G01C 22/00*   (2006.01)

(52) U.S. Cl. ........................ 701/23; 701/207; 701/224; 318/568.12

(58) Field of Classification Search .................. 701/23, 701/25, 27, 77, 207, 222, 224; 318/568.12
See application file for complete search history.

(56) References Cited

U.S. PATENT DOCUMENTS 4,852,677 A    8/1989  Okazaki
5,156,038 A   10/1992  Kozikaro (Continued)

FOREIGN PATENT DOCUMENTS

EP    0 803 224 A2    10/1997

(Continued)

*Primary Examiner*—Gertrude A. Jeanglaude
(74) *Attorney, Agent, or Firm*—Pearne & Gordon LLP (57) ABSTRACT

A carrier, such as an autonomous surface treatment device, e.g., a robotic vacuum cleaner, has motive units, such as wheels, for transporting the carrier over a field of operation. The state of the carrier, which can be its position on the field of operation, is determined based, at least in part, on the actual track width of the motive units which will change depending on the carrier's driving mode. For example, when the carrier is operating in a driving mode where it is turning, the actual track width of the motive units will be different from the actual track width of those units when the carrier is proceeding straight ahead. A determination is made of the driving mode in which the carrier is operating at the time its state is to be determined, and the actual track width of the motive units that corresponds to that driving mode is employed in determining the state of the carrier.

34 Claims, 7 Drawing Sheets

U.S. PATENT DOCUMENTS

| | | |
|---|---|---|
| 5,214,822 A | 6/1993 | Sakurai et al. |
| 5,325,468 A * | 6/1994 | Terasaki et al. ............ 700/262 |
| 5,353,224 A | 10/1994 | Lee et al. |
| 5,402,365 A | 3/1995 | Kozikaro et al. |
| 5,440,216 A | 8/1995 | Kim |
| 5,684,695 A | 11/1997 | Bauer |
| 5,720,077 A | 2/1998 | Nakamura et al. |
| 5,794,166 A | 8/1998 | Bauer et al. |
| 5,815,880 A | 10/1998 | Nakanishi |
| 5,935,179 A | 8/1999 | Kleiner et al. |

FOREIGN PATENT DOCUMENTS

| | | |
|---|---|---|
| JP | 9-319435 | 12/1997 |
| WO | WO 95/26512 | 5/1995 |
| WO | WO 97/40734 | 11/1997 |
| WO | WO 97/41451 | 11/1997 |
| WO | WO 99/40496 | 8/1999 |
| WO | WO 99/59402 | 11/1999 |
| WO | WO/00/10062 | 2/2000 |
| WO | WO 00/38025 | 6/2000 |
| WO | WO 00/38028 | 6/2000 |
| WO | WO 00/38029 | 6/2000 |

* cited by examiner

METHOD AND DEVICE FOR DETERMINING POSITION OF AN AUTONOMOUS APPARATUS

TECHNICAL FIELD

The present invention relates, generally, to a system for determining the state of a carrier, such as its position or location, on a field of operation over which the carrier traverses.

BACKGROUND

Autonomous apparatuses, such as robotic vacuum cleaners and other self-propelled devices, are well known in the prior art as, for example, disclosed in International Patent Applications WO 97/41451 (U.S. Pat. No. 5,935,179) and WO 00/38028. These autonomous apparatuses, generally, have a main body, supported on or by a number of motor-driven wheels or rollers and include means for surface treatment, such as a rotating brush in combination with a vacuum cleaning device. Typically, they are provided with systems for guidance and navigation, together with a sensing system for obstacle detection. The sensing system generally sweeps around the horizon in a manner similar, for example, to a ship's radar. The autonomous devices usually include microprocessors, together with appropriate software, for controlling the functioning of the devices. Normally, a microprocessor receives input data from the motor driven wheels and the sensing system for the purpose of determining the position of the device and the locations of wall limitations and potential obstacles. This input data is then used as the basis for navigating the autonomous device so that it will be able, for instance, to perform a cleaning function or other surface treatment function on a field of operation according to some predetermined strategy while at the same time avoiding collisions with any obstacles or barriers such as walls, tables, bookcases or the like.

Typically, an autonomous apparatus orients itself at any time within a field of operation defined by a map that is generated on the basis of information obtained from a sensing system. Furthermore, the map, typically, is updated by the autonomous apparatus during its movements. It is important that as accurate a map as possible be generated. It is also important that the exact position and orientation of the apparatus within the field of operation defined by the map be determined in order for the apparatus to satisfactorily perform its functions. Although several types of systems for the self-determination by an autonomous apparatus of its position have been developed, systems having distance sensors that take their input information from the rotation of the wheels on which the autonomous apparatus is transported, have proven to be most cost-effective.

Cost-effective, internal, position-determination systems, usually, comprise wheel sensors that register the number of times the wheels have rotated. In order to determine the distance the apparatus has traveled since a previous registration, the number of wheel rotations is applied to the diameters of the wheels. This distance calculation can be made with reasonably good accuracy when the surface of the field of operation is not too soft and the effective wheel diameter can be assumed to be constant. However, when the surface is slippery or soft, the apparatus may skid and/or the wheels may spin. In those instances, the calculated distance traveled, based on the number of wheel rotations, is incorrect. In order to correct for such circumstances, a position calibration method has to be carried out. Such a method is disclosed in U.S. Pat. No. 5,794,166.

The method disclosed in U.S. Pat. No. 5,794,166 includes predicting the cumulative overall slippage of the apparatus that occurs when the apparatus travels from a starting point to a destination point along an imaginary path. The creation of the imaginary path includes a first step of rotating the apparatus at the starting point so that the apparatus is directed toward the point of destination. The apparatus is assumed to then travel forward from the staring point to the destination point. Finally, a rotation of the apparatus at the destination point to align it in a predetermined position is assumed to occur. An overall slippage component for each wheel is calculated, based on at least one distance-dependent slippage factor.

To perform the method of U.S. Pat. No. 5,794,166, the track width of the autonomous apparatus must be known. The track width is the distance that separates the effective contact points between the two driving wheels and the surface over which the apparatus operates. The track width is also utilized for calculating the angles through which the autonomous apparatus would be required to turn along the imaginary path.

A difficulty with the method disclosed in U.S. Pat. No. 5,794,166 is that the actual track width of the autonomous apparatus will vary, depending on the type of surface over which the apparatus is to travel and the nature and direction of any turns the apparatus makes. This is because the locations of the effective contact points between the wheels and the surface will vary, so as to vary the actual track width, and because the suspensions of the wheels are not totally rigid. As the effective contact points are displaced during turning of the apparatus, the actual track width will change, and the slippage calculation made in accordance with the method disclosed in U.S. Pat. No. 5,794,166 will prove to be erroneous.

SUMMARY

An object of the present invention is to provide a system for accurately determining the state of a carrier on a field of operation. Another object of the present invention is to provide a calibration procedure for the system.

The state of a carrier, such as its position and location on a field of operation, can be determined employing the track width of the motive units that transport the carrier as one of the determinants. A carrier will have the ability of operating in one or more driving modes, and, according to the invention, accurate determinations of the state of the carrier are accomplished as a result of the recognition that the track width of the motive units varies as a function of the type of movement, or driving mode, in which the carrier is engaged. It is necessary to account for that variability, as the present invention does, if an accurate determination of a state of the carrier, such as its position or location, is to be made.

According to one aspect, a carrier is provided with means comprising two oppositely disposed motive units for transporting the carrier over a field of operation. The state of the carrier on that field of operation is determined by using the actual track width of the motive units, at least in part, as a determinant of the carrier's state. One or more potential driving modes for the carrier is related to the actual track widths that result when the carrier operates in those modes. A determination is made of the driving mode in which the carrier is operating at the time its state is to be determined and the actual track width that corresponds to that driving mode is employed in determining the state of the carrier.

According to another aspect, the motive units comprise wheels that are arranged to be driven independently of one another and the driving mode employed is defined by the overlapping of a range of rotational velocities for each wheel. Other driving modes employed are as follows: a driving mode defined by a range of rotational velocities for only one of the wheels; a driving mode defined by a specific ratio between the rotational velocities of the two wheels; a driving mode defined by a range of ratios between the rotational velocities of the two wheels. Additionally, a grouping of five driving modes can be employed. In that case, a first mode is defined by both wheels having equal rotational velocities in a direction tending to move the carrier in a forward direction; a second and third modes are defined, respectively, by the rotation of one wheel in one direction or the other and the rotation of the other wheel in the opposite direction at the same rotational velocities; and a fourth and fifth modes are defined, respectively, by the rotation at one rotational velocity of one or the other of the wheels in a direction tending to move the carrier forward, either alone or together, with the rotation in the same direction at a lower rotational velocity of the other of the wheels.

According to yet another aspect, the state of the carrier to be determined is the position of the carrier in the field of operation and the carrier comprises an autonomous vacuum cleaner.

According to still another aspect, the carrier is calibrated and actual track widths are related or correlated to potential driving modes by aligning the carrier in an initial known direction or position. The carrier is then driven in accordance with a driving mode. A determination is made of the angle through which the carrier has turned while being driven in that driving mode. The distance each of the motive units or wheels has traveled while the carrier has turned through that angle is determined. The actual track width for that driving mode based on the distance and angle determinations is then calculated.

According to yet another aspect, the calculating step in the calibration procedure includes calculating an approximate angle through which it is estimated that carrier has turned based on the distance determinations for the motive units or wheels and an assumed track width. Thereafter the difference between the approximate angle and the determined angle is calculated. At that point, the actual track width is calculated as a correction to the assumed track width based on that calculated difference.

BRIEF DESCRIPTION OF THE DRAWINGS

The invention, together with further objects and advantages thereof, will be best understood by reference to the following description taken together with the accompanying drawings, in which.

DETAILED DESCRIPTION

In the following, the invention will be described with reference to a particular example of a carrier that traverses a field of operation, namely an autonomous vacuum-cleaning device. It should be understood, however, that the invention is not limited thereto, and that the invention is applicable to various types of carriers or vehicles, such as transport vehicles employed in manufacturing environments, multi-purpose robots, robotic lawnmowers and autonomous surface-treatment devices for sweeping, brushing and polishing floors. Throughout the drawings, the same reference characters are used for corresponding or similar elements.

In the present disclosure, the term "velocity," is applied to values that have both a magnitude and a direction, i.e. the values can be either positive or negative, while the term "speed" is applied to the absolute value of velocity.

General Features

Figure 1:
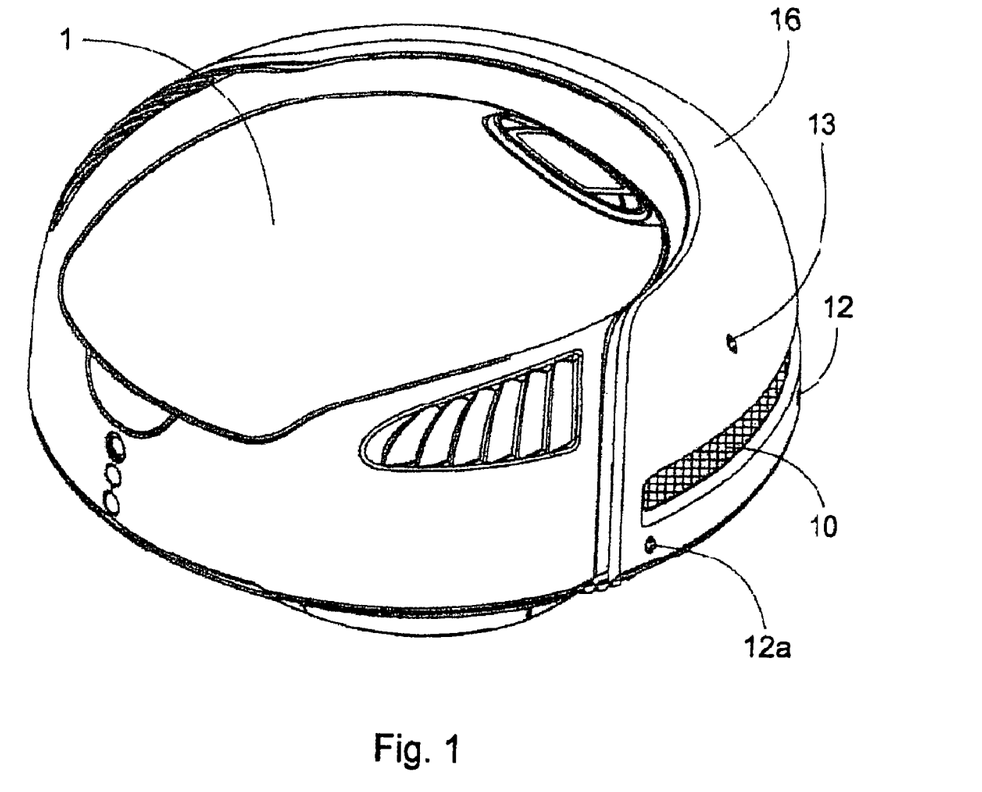
FIG. 1 illustrates a three-dimensional top view of an embodiment showing an autonomous apparatus in the form of a vacuum-cleaning robot equipped according to the present invention.
Figure 2:
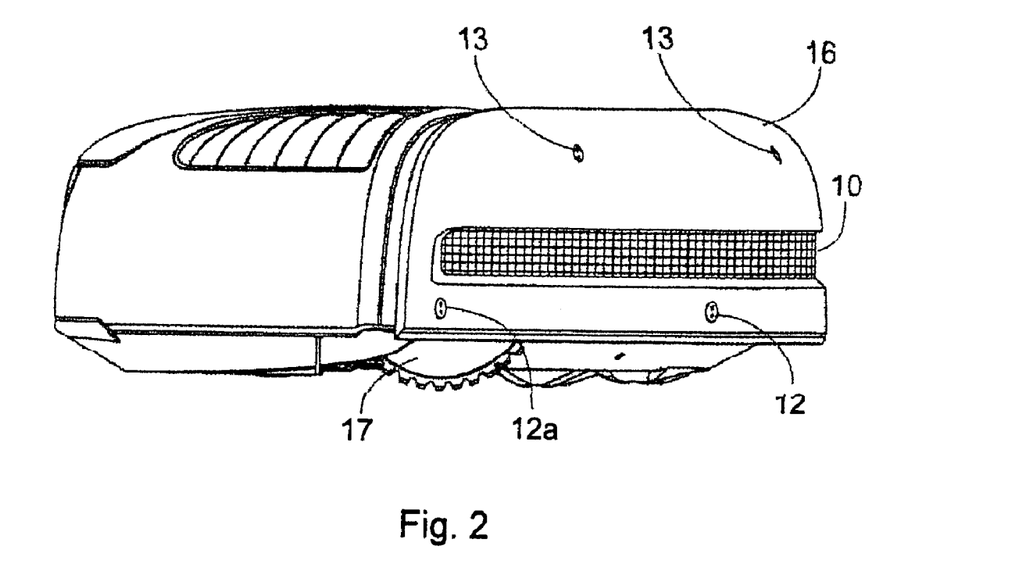
FIG. 2 is a side view of the autonomous apparatus shown in FIG. 1.
Figure 3:
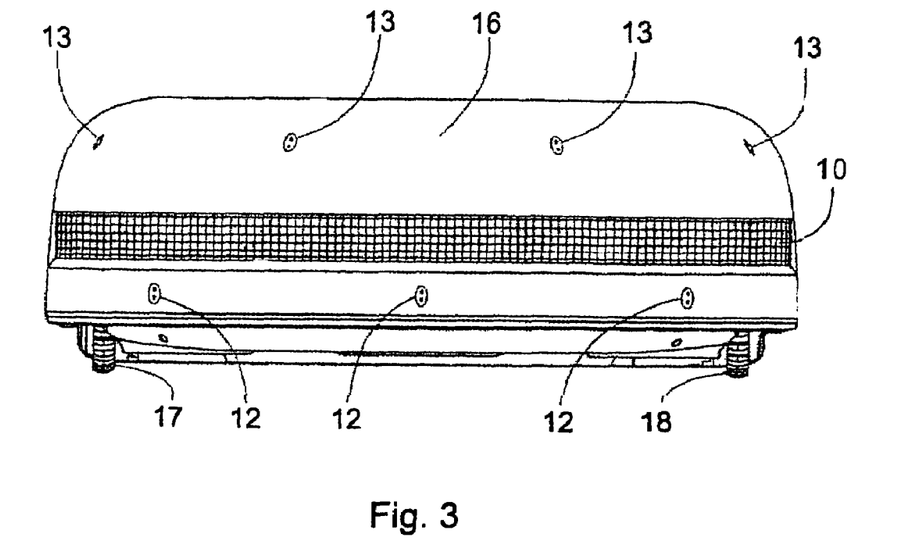
FIG. 3 is a front view of the autonomous apparatus shown in FIG. 1.

FIG. 1 is a three-dimensional top view of an autonomous vacuum-cleaning device 1, which, under its own power, moves over a floor and vacuum cleans a room. At the front of the device there is arranged an ultrasonic system comprising an ultrasonic transmitter 10 and ultrasound, echo-sensor microphone units 12 and 13. The ultrasonic transmitter 10 is strip-shaped and is of a length covering approximately 180 degrees of the perimeter of the device, as illustrated in FIGS. 2 and 3. As seen in FIG. 2, the transmitter 10 is mounted above a lower, first row of ultrasound, echo-sensor microphone units 12 and below an upper, second row of ultrasound, echo-sensor microphone units 13. The ultrasonic sonar system, formed by the transmitter 10 and the microphone units 12 and 13, aids in the navigation of the device as it traverses the floor of an area to be vacuumed. In the illustrated embodiment, the transmitter is countersunk in a forward-directed bumper unit 16. The bumper 16 controls a left and a right bumper touch sensor 12a, either one being actuated if the bumper makes contact with an obstacle.

From FIGS. 2 and 3 it will be seen that the device has means comprising two oppositely disposed motive units, i.e., diametrically positioned wheels 17 and 18, for transporting the device over a field of operation. Each wheel is independently driven by a separate motor, preferably equipped with a gearbox. This independent arrangement of the wheels allows the wheels to be driven at different speeds and in opposite rotational directions whereby the carrier is provided with the capability of operating in one or more driving modes. For example, the driving wheels 17 and 18 can be driven at equal speeds in opposite directions thereby establishing a driving mode which enables the device to rotate around its own center of symmetry. On the axle or shaft from each motor driving a respective wheel 17 or 18, a quadrature sensor is mounted. Quadrature signals from the sensors are received by a built-in microprocessor controlling the device. The signals from these sensors, or equivalent devices, are used for obtaining a dead count for estimating the distance of travel. This function is described in greater detail below.

Optional wheels can be provided to support the rear of the device. The device is generally balanced with a slightly larger weight on its rear half which carries, for instance, the batteries for driving the motors for wheels 17 and 18. As a result, the device is more likely to move with all its wheels in contact with the surface over which it traverses and it will easily pass over the edges of floor carpets and the like.

The autonomous device may advantageously be equipped with Hall-effect sensors, one being located in front of each wheel 17 and 18, for the detection of a magnetic fence and/or one or more magnetic strips. Magnetic fences and magnetic strips are used to restrict the movement of the device. For example, a fence can be placed in front of a stairway so that the device does not fall down the stairs. A fence can also be placed in a doorway so that the movement of the device can be confined to one room without having to close the door between the rooms. Thus, it is possible to clean one room at a time, which is an effective way of cleaning. Magnetic strips can be located adjacent to an automatic charging station in a manner so that the device may appropriately position itself in order to have its batteries recharged.

Figure 4:
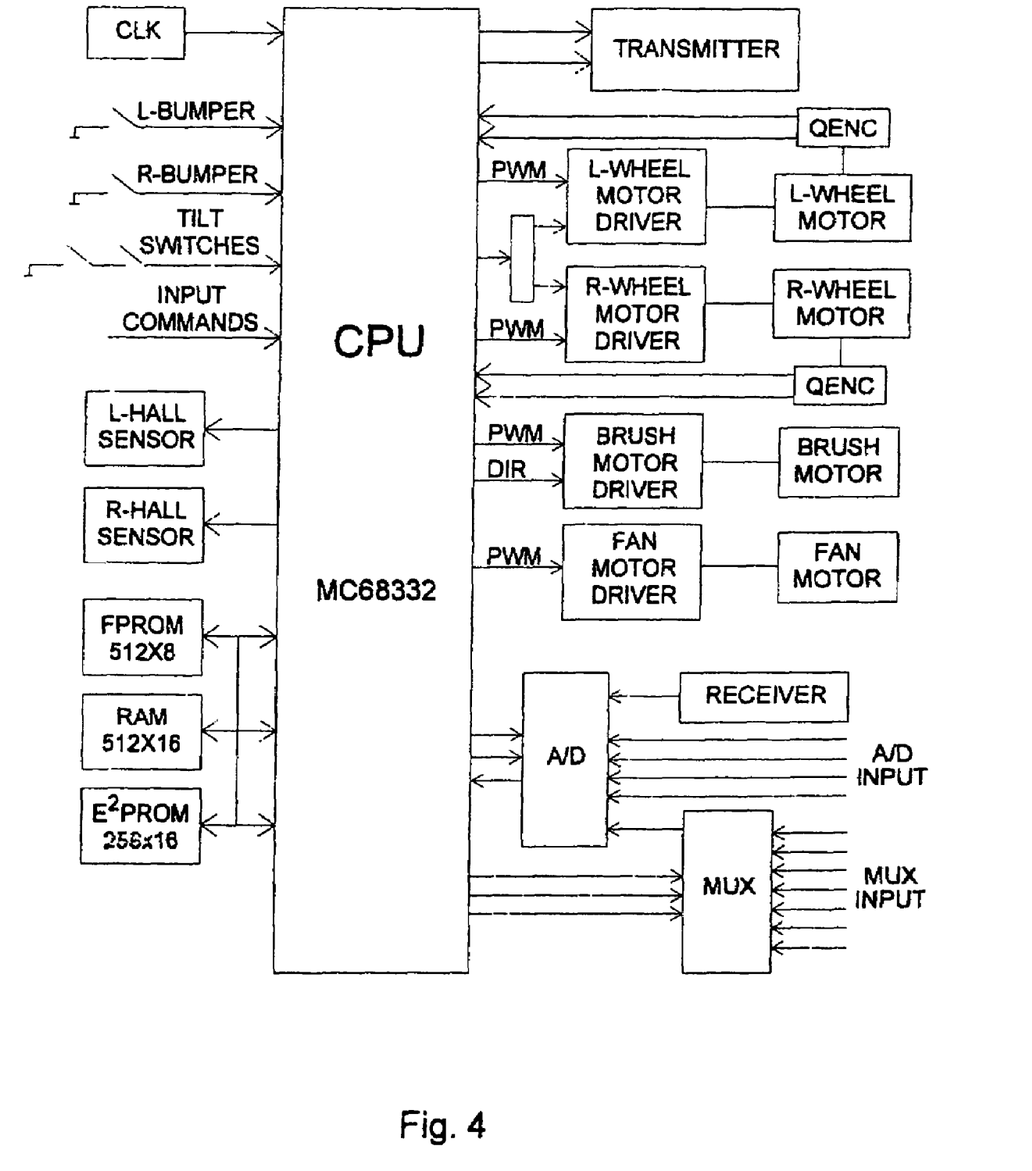
FIG. 4 illustrates a block diagram of the hardware that controls the operation of the apparatus shown in FIG. 1.

FIG. 4 is a block diagram of the hardware that controls the operation of the device illustrated in FIGS. 1, 2 and 3. The hardware, basically, consists of a processor board, which is configured to drive the two wheel motors; the ultrasonic transmitter, together with the corresponding ultrasound echo-sensor microphone units; and the fan and brush motors, as well as other components of the autonomous vacuum cleaning device. The processor board is essentially built around a main data processor or central processing unit (CPU) such as the MC68332 from Motorola Inc. The MC68332 is a highly-integrated microcontroller that combines data manipulation capabilities with peripheral subsystems.

The sonar system, formed by the transmitter and microphone units, is utilized for obstacle detection purposes, such as the detection of obstacles in the path of the device as it moves, and the pinpointing of the nearest obstacle. The main processor controls the transmitter and receives input data from the microphone units for subsequent evaluation.

The processor also controls the motor for the vacuum cleaners rotating brush, as well as the motor for the cleaner's fan which generates the necessary vacuum for the functioning of the vacuum cleaner. Air from the fan motor is, additionally, in a known manner, utilized for cooling purposes, with the air being exhausted through a grilled outlet at the top of the cleaner.

The main processor is controlled by software stored in a number of different types of digital memories, for example, FPROM, RAM or $E^2$PROM, which are all well known to a person familiar with the computer art. Additionally, the processor has its own clocking system (CLK) also known from the prior art.

The system, as illustrated in FIG. 4, further comprises two bumper switches and two tilt switches. The two bumper switches, L-Bumper and R-Bumper, are connected to two TPU input pins working in discrete input/output (I/O) mode and are used, as a complement to the sonar system, for the detection of collisions with obstacles. The tilt switches are used to detect whether the device is level with respect to the floor or at an angle to it.

The system of FIG. 4 also includes a number of switches for input commands from a control panel. This enables the user, for example, to turn the vacuum cleaner on and off, and to select one of a number of cleaning programs to be executed by the cleaner.

Signals representative of the magnetic fields that are sensed by the Hall sensors are fed to the main processor via the analog to digital (A/D) converter and processed to allow the detection, for example, of a magnetic fence or magnetic strips installed at an automatic charging station. The offset voltages of the analogue Hall sensors may vary with time, temperature and individual sensors, and, therefore, a zero-field reference point is constantly recalculated with a slow averaging filter and adjusted based on pulse width modulated signals from the main processor.

In order to detect malfunctions, various signals are continuously measured and fed to the processor for evaluation, either directly via the A/D converter or first through the multiplexer (MUX).

The wheel motors are separately controlled by pulse-width modulated (PWM) signals of 5 kHz, generated by channels from the Time Processor Unit (TPU) in the CPU. In order to detect the number of times each wheel has rotated, the quadrature encoders (QENC) mounted in connection with the wheel motors generate quadrature signals that are connected to TPU inputs of the MC68332. The quadrature signals are processed by the CPU to provide information as to the position of the device by keeping track of the distance the device has traveled and, preferably, also the extent to which the autonomous device has rotated during movement, all as described in more detail below.

Position Determination

According to the present invention, in determining the position of an autonomous carrier or vehicle, such as a robotic vacuum cleaner, in a field of operation, it is necessary to know the distances the motive units or wheels that transport the carrier have traveled during the course of travel of the carrier from its last known position and the turning movements the carrier has made during its course of travel.

In the presently preferred embodiment, the distances the wheels have traveled are ascertained by noting the number of times the drive shafts of the motors for the wheels have rotated while the carrier has moved from a known to a new position. For purposes of measuring the distances the wheels have traveled, it is necessary only to multiply the number of rotations that have occurred by the circumference of the wheels. On the other hand, as will be explained in greater detail below, the angular change in direction the carrier has made, as a result of its turning movements during its course of travel, is a function of both the distance each wheel has traveled and the track width of the wheels.

Figure 7:
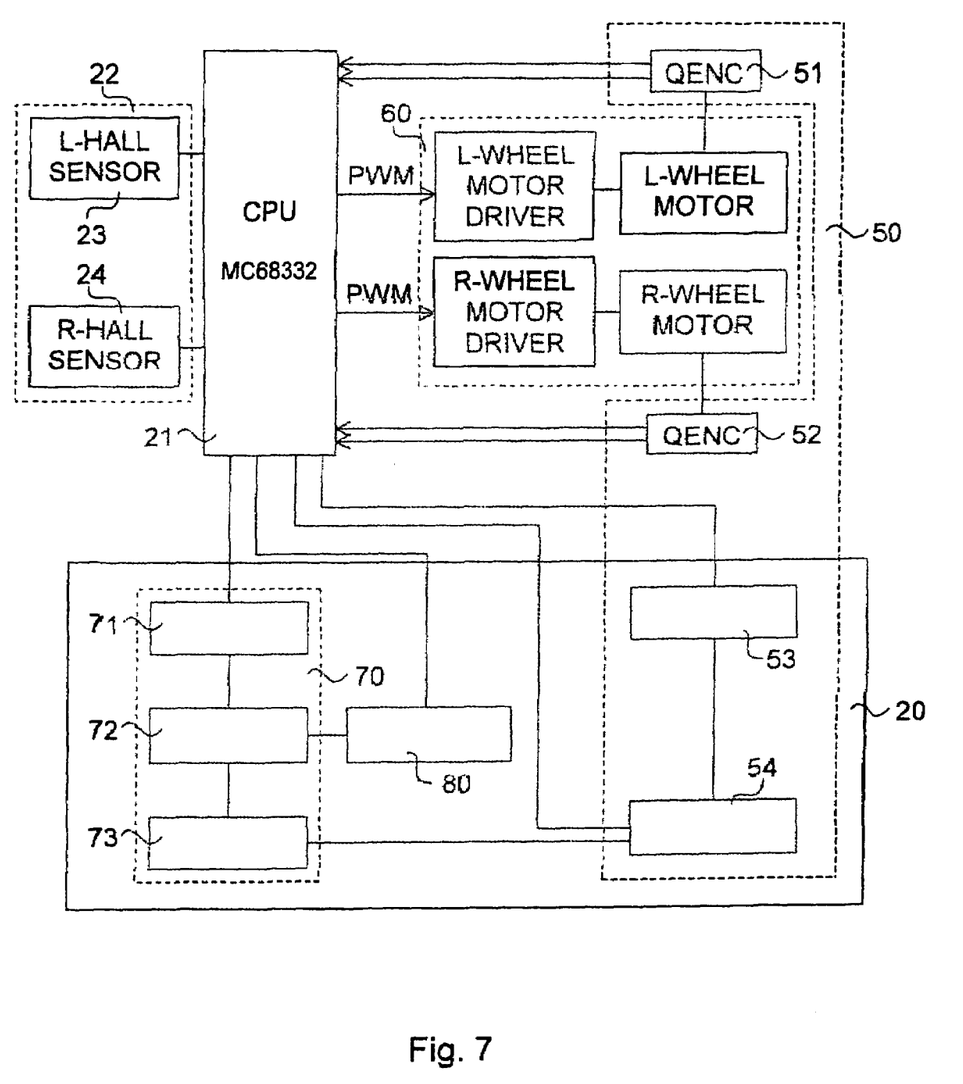
FIG. 7 is a detailed view of the block diagram of FIG. 4, highlighting the hardware and the software primarily used by the present invention.

In order to determine the number of times each drive shaft has rotated, encoders 51 and 52 are used as illustrated in FIG. 7. According to the presently preferred embodiment, each encoder 51 and 52 is made of Hall sensors generating a quadrature signal in response to the rotation of a magnetic disc mounted so as to rotate together with a respective wheel 17 or 18. Each magnetic disc is divided into a number of sectors having different magnetic directions. As the discs rotate, the encoders 51 and 52 register the changes in magnetism that occur and, thereby, measure the rotations of wheels 17 and 18. Other devices for measuring the rotations of the wheels may be used. These include slotted disc encoders and related devices.

Figure 6A:
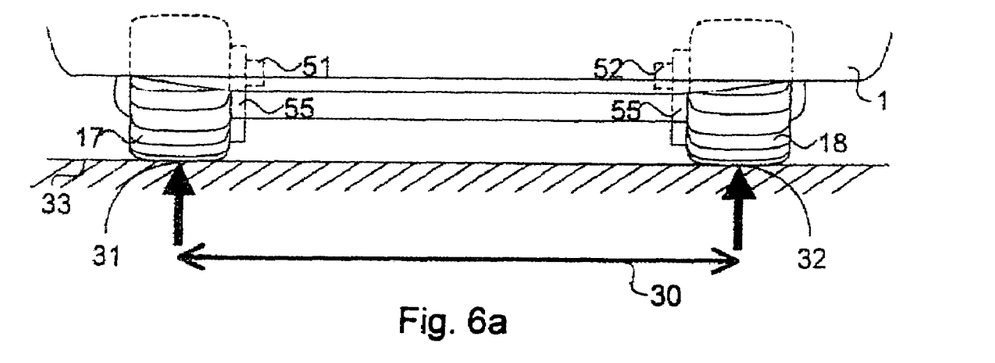
FIGS. 6a and 6b illustrate the manner in which the actual track width of an autonomous apparatus may vary.
Figure 6B:
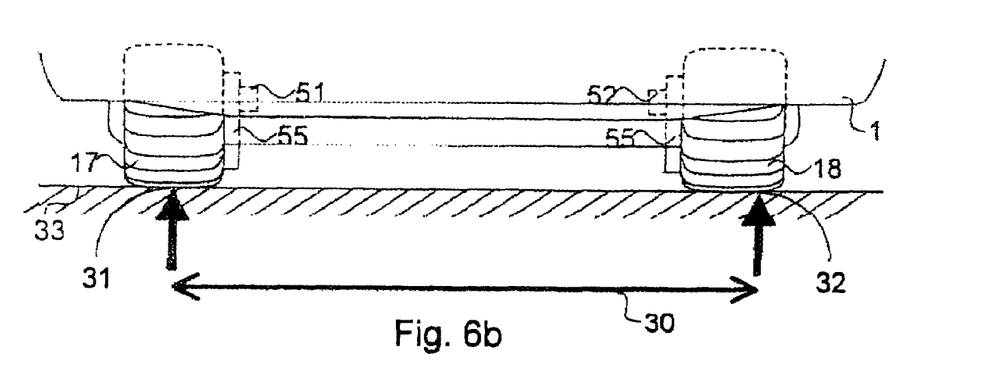

The heading of the autonomous cleaner as a result of its turning, can be calculated from the following formula:

$$\Delta\alpha = \frac{DistRight - DistLeft}{TrackWidth} \cdot \frac{180}{\pi} \quad (1)$$

where $\Delta\alpha$ is the angle, in degrees, through which the cleaner has turned from its previous position; DistRight and DistLeft are the distances traveled by the right and the left wheels, respectively; and TrackWidth is the actual track width 30 of the cleaner as illustrated in FIGS. 6a and 6b. Thus, to determine the heading of the cleaner, in addition to needing to know the distance each wheel has traveled, the actual track width 30 must be known.

The difficulty in establishing the track width 30 of the carrier is that it varies depending on the driving mode of the carrier which, in turn, depends on the type of surface being cleaned, as well as on the severity and direction of any turn the carrier is making. Referring to FIG. 6a, which is a view from the front of and along the bottom of the vacuum cleaner, there are illustrated the wheels 17 and 18 of the carrier in engagement with surface 33 at effective contact points 31 and 32. This would be the case when the apparatus is proceeding straight ahead with the same rotational speed applied to both driving wheels. The effective contact points 31 and 32, typically, in this driving mode, are located at the mid-points of the widths of the wheels 17, 18. The distance between these effective contact points defines the actual track width 30 of the carrier for the driving mode where the carrier is travelling straight ahead.

In FIG. 6b, the actual track width 30 is shown when the carrier is in a different driving mode. In this driving mode the carrier is turning to the right while proceeding forward. As a result, the effective contact point 32 of the driving wheel in the direction of the turn, i.e., the right wheel 18, is displaced from the mid-point of the width of the wheel toward the side of the wheel that faces the turning direction. This displacement of the effective contact point for wheel 18 changes the actual track width 30 of the wheels.

FIGS. 6a and 6b are, merely, examples illustrating the dependence of the actual track width 30 upon the driving mode of the carrier. The effective contact points 31 and 32 and, consequently, the actual track width will also change with other driving modes, but the importance of determining the actual track width so that an accurate determination of the turning angle of the carrier may be made will be understood.

Figure 5A:
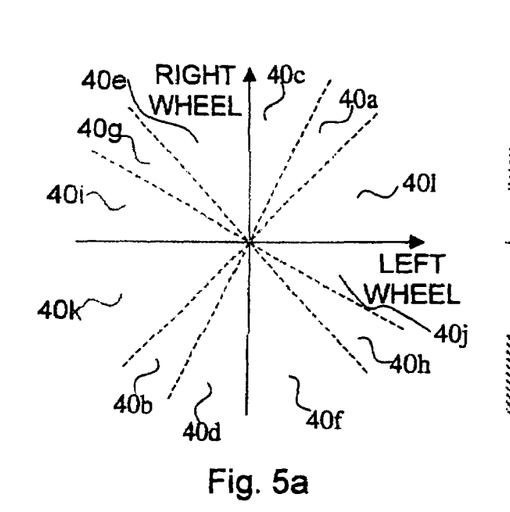
FIGS. 5a, 5b and 5c illustrate possible ways of defining the driving modes of an autonomous apparatus according to the present invention.
Figure 5B:
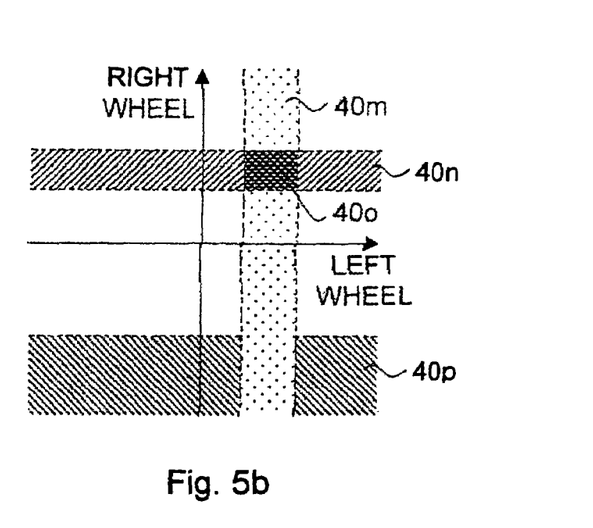
Figure 5C:
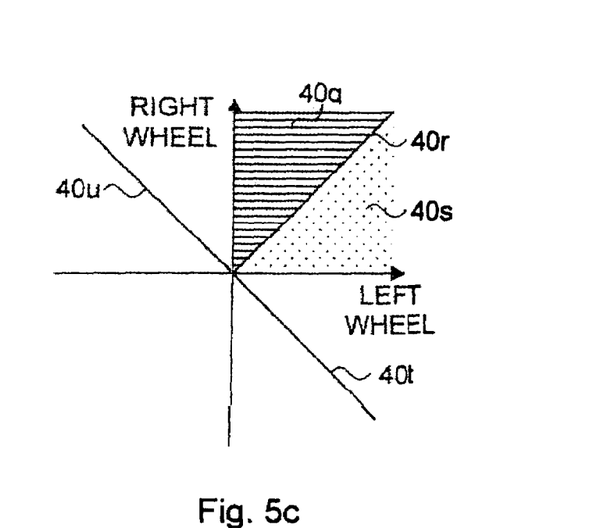

Different driving modes, representative of and corresponding to different actual track widths, may be defined by the rotational velocities of the driving wheels 17 and 18 as illustrated in FIGS. 5a, 5b and 5c. These figures represent three different embodiments of establishing correlations between the rotational velocities of the driving wheels and driving modes. All three figures are based on a coordinate system in which the x-axis represents the rotational velocity of the left wheel and the y-axis represents the rotational velocity of the right wheel. Which wheel is defined as the left wheel or the right wheel does not matter as long as whichever axis is selected for a particular wheel is consistently applied to that wheel.

In the embodiment of the present invention illustrated in FIG. 5a, the driving modes are defined by a respective range of ratios between the rotational velocities of the wheels in the form of:

$$A \leq \frac{VelRightWheel}{VelLeftWheel} \leq B \quad (2)$$

where VelRightWheel and VelLeftWheel are the velocities of the two driving wheels 17 and 18, respectively, and A and B are the limits within which the ratio associated with any individual driving mode is to be defined. This way of defining the driving modes results in the coordinate system of FIG. 5 being divided into sectors 40a–40l that represent different driving modes corresponding to different actual track widths.

The ratio between the rotational velocities of the two wheels will be the same if their magnitudes are the same even though the directions of rotation are different. Thus, if the ratio of the rotational speed of the wheels is the single defining parameter, driving forward with both wheels rotating at the same velocity and driving backwards with the same rotational speed for the wheels are defined, in this embodiment, as the same driving mode. As a result, in FIG. 5a, sectors 40a and 40b represent the same driving mode and produce the same actual track width. However, additional defining parameters, such as the algebraic sign of the velocities of the wheels, may also be used. In that case, the sectors 40a and 40b may constitute different driving modes with different actual track widths.

FIG. 5b illustrates another embodiment for defining driving modes. The driving modes 40m–40o are illustrative of modes where the rotational velocity of only one wheel is within a specified range that defines the driving mode and also where the rotational velocities of both wheels are within specified ranges that define a driving mode where the ranges of velocities overlap. In other words, ranges can be applied for each wheel independently or simultaneously for both wheels. Thus, for the driving mode represented by 40m, the mode is set by a specified range of velocities for the left wheel regardless of the velocity of the right wheel. Conversely, for the driving mode represented by 40n, the mode is set by a specified range of velocities for the right wheel regardless of the velocity of the left wheel. In the case of driving mode 40o, the velocities of both wheels define the driving mode where the ranges of velocities for the two wheels overlap and a more precise definition of a driving mode is obtained in that case. For some operations it may be sufficient to base the driving mode definition on the rotational velocity of only one wheel. A general definition of a driving mode may be used as shown by the driving mode 40p which illustrates the use of only a single limit on the velocity of the right wheel and no limit on the velocity of the left wheel.

The driving modes illustrated in FIG. 5b are presented for the purpose of providing a greater understanding of the many possibilities that exist for defining driving modes. Preferably, however, the driving modes used should be complementary and cover all motion patterns of which the carrier is capable.

FIG. 5c illustrates an embodiment of the invention that defines a selection of driving modes that is presently preferred. In FIG. 5c, illustrates a selection of five driving modes that may be used by the carrier. The three driving modes represented at 40r, 40t and 40u correspond to rotational velocities of the wheels that produce a single ratio in each case. A first driving mode 40r represents forward travel of the carrier wherein the rotational velocities of the two driving wheels 17 and 18 are the same. For this driving mode, the actual track width is equal to the distance between the mid-points of the wheel widths as illustrated in FIG. 6a, with, possibly, some compensation being made for unintentional turns. Second and third driving modes 40t and 40u are representative of driving modes when the apparatus turns in place around its own axis of symmetry. The magnitudes of the rotational velocities of the wheels are the same in that case but the directions of rotation are opposite. In driving mode 40u, the right wheel is rotating in a forward direction whereas the left wheel is rotating in a backward direction. The opposite is true for driving mode 40t, where the left wheel rotates in a forward direction and the right wheel rotates in a backward direction. The fourth and fifth driving modes 40q and 40s represent modes where the carrier is turning while moving forward and correspond to rotational velocities of the wheels that produce ranges of ratios. Driving mode 40q represents a mode where the carrier is turning to the left, and driving mode 40s represents a mode where the apparatus is turning to the right. In driving mode 40q, the right wheel is rotating forward, either alone or in combination with the forward rotation of the left wheel. Of course, in that instance, the rotational speed of the left wheel will be slower than the rotational speed of the right wheel. Conversely, for driving mode 40s, the left wheel is the wheel that rotates alone or faster than the right wheel. In this selection, or grouping, of driving modes, the apparatus is never allowed to move backward. Instead, it turns in place 180 degrees and then moves forward. The carrier's movements are, thus, limited to the five driving modes described, and they are sufficient to cover all the motions required for the carrier to carry out its functions. A backward motion may, however, be used in particular instances, such as when the carrier encounters an obstacle or a magnetic fence. If a backward motion is allowed, preferably, it will be represented by a driving mode where the carrier moves straight back and the actual track width in that case will be as illustrated in FIG. 6a.

The foregoing concept of providing for the potential of a carrier to have several driving modes, and relating each of those driving modes to an actual track width for the carrier's motive units so that some state of the carrier that is dependent on the actual track width can be accurately determined, will now be described with reference to the manner in which the position of the autonomous vacuum cleaner shown in the Figures may be determined as it moves across a surface to be cleaned.

FIG. 7 illustrates a portion of the hardware block diagram of FIG. 4 in detail with elements not directly used for the purpose of position determination being omitted. In order to move the autonomous cleaner 1, two pulse-width modulated signals (PWM) are outputted from the time processor unit in microprocessor 21. These PWM signals separately control the applied voltage to each driving motor and thereby control the rotational speeds and directions of rotation of a respective wheel 17 or 18.

The position determination system 50, functioning in cooperation with microprocessor 21, serves to determine the position of the cleaner on the surface to be cleaned. As mentioned above, means in the form of encoders 51 and 52 register the rotations of the motor shafts driving the wheels, thereby generating quadrature signals that are sent to the microprocessor 21 where corresponding wheel velocities are determined. In order to determine the change in position of the cleaner since the last such determination, the actual track width of the cleaner's wheels must be determined and this is done with reference to the cleaner's driving mode. The determination is made by means of software stored in digital memory 20. Based on the wheel rotational velocities, encoded in the quadrature signals, driving mode determination means 54 in the digital memory 20 is used to determine the driving mode of the cleaner, the information in the determination means being loaded and executed in the microprocessor 21. Applying this determination of the driving mode, the associated actual track width is obtained. The actual track width is then used in subsequent calculations for determining the position of the cleaner.

Once the actual track width is known from the driving mode in effect, the change in position of the carrier is calculated by calculation means 53 of position determination means 50. As with driving mode determination means 54, the information in the calculation means 53 is stored in the digital memory 20 and loaded and executed in the microprocessor 21. The traveled distance is calculated based on the wheel rotations and the diameters of the wheels, whereas the heading of the carrier is calculated by the application of equation (1).

From the foregoing description it will be understood that, by starting in an initial, well-defined position for a carrier, calculating position changes at intervals as the carrier moves, and storing this information in the digital memories, the movement of the carrier is continuously monitored and its position at any time is known. Information as to the position of the carrier may be used, together with a map of the area of operation, by autonomous surface-treatment devices to identify which sections of the area of operation have been treated and which have not.

From certain operational points of view, it may be preferable to store in memory 20 several different definitions of driving modes together with the different actual track widths that are associated with those driving modes. An operator can then select the driving modes which are to apply in different circumstances such as when, for example, the surface characteristics of the field of operation change or when the autonomous carrier is to perform a new operation for which the driving mode previously selected is not representative. According to the present invention, however, the selection of the driving mode, preferably, is performed by a calibration method, which will now be described.

Referring to FIG. 7, initially, aligning means 22 aligns the autonomous carrier in a known direction. The aligning means 22 controls the driving means 60 via the PWM signals from the microprocessor 21 so as to position the carrier in that known direction. The aligning means 22, preferably, comprises magnetic detectors 23 and 24, e.g. Hall sensors, that detect a magnetic field that is located so as to position the carrier in the known direction. The magnetic field may originate from strips of magnetic materials or other magnetic sources, such as a magnetic fence and/or one or more of the magnetic strips employed in connection with the automatic charging station referred to above. Other aligning embodiments are possible; the aligning means 22 may comprise push buttons that an operator pushes for the purpose of establishing, as the carrier's initial known direction, the direction in which the carrier is facing at the time. In that instance, no movement of the carrier is required to provide an alignment which is used for the succeeding calibration operation. Alternatively, an external signal may be delivered to the carrier to trigger the calibration operation. In that case, the aligning means 22 would comprise a receiver, sensitive to the external signal.

Once the carrier has been aligned in an initial direction, the microprocessor 21 is caused to send PWM signals to the driving means 60 so as to drive the wheels at speeds of a ratio comprehended by one of the driving modes stored in memory 20, thereby causing the carrier to proceed in accordance with that selected driving mode. For example, if the carrier moves according to the driving mode 40r in FIG. 5c, it will move straight ahead, i.e., without any turning. In this driving mode, the actual track width is equal to the distance between the mid-points of the widths of the wheels as shown in FIG. 6a, and no calibration is necessary. On the other hand, if the wheels are driven at different speeds, causing the carrier to operate in a different driving mode and turn as it moves forward, a calculation must be made to obtain the actual track width for that driving mode. In order to make the calculation, the actual angle through which the carrier turns as it proceeds in the selected driving mode must be determined. This is accomplished by means 80 which uses an internal or external reference for obtaining the actual turning angle.

Gyroscopes, sensitive to changes in the direction of travel, can be used as an internal reference for calculating the actual turning angle of the carrier. External references that can be used include magnetic fields sensed by the magnetic detectors 23 and 24 of aligning means 22 or other magnetic detectors. Just as for the initial alignment of the carrier, other external signals, such as a signal beacon, or another source located in the area of operation, may be used as a stationary reference. During the turning of the carrier in the selected driving mode, the angles of the magnetic detectors on the carrier change relative to the reference and the reference means 80 can, thereby, calculate the actual turning angle of the carrier. Alternatively, the apparatus may be caused to turn through a predetermined angle which could be determined by the operator. The wheel rotations that occur during any of these turnings of the carrier are registered by the encoders 51 and 52 and the respective distances the wheels have traveled are determined from the information the encoders provide.

By using the information as to wheel rotations and turning angle, the actual track width of the driving mode can be calculated by calculation means 70. In the embodiment illustrated in FIG. 7, the calculation proceeds in the following manner. From the wheel rotations, an expected turning angle of the carrier is calculated in an expectation means 71, based on an assumed track width. The assumed track width may be the track width used for straight forward movements, i.e., 40r in FIG. 5c, or a previously calculated track width. Difference means 72 calculates the difference between the actual turning angle, determined by the reference means 80, and the expected turning angle obtained from the expectation means 71. Based on this difference, a correction of the assumed track width is determined by correction means 73. The assumed track width is then calibrated to correspond to the actual track width 30.

It is also possible to calibrate the apparatus by rotating the wheels a predetermined number of rotations, determining the corresponding actual turning angle and calculating the actual track width based on that information.

The actual track widths may, using the methods described above, be calculated at one instance, e.g., at the start of the operation, for all possible driving modes. The information relating or correlating the driving modes to actual track widths may then be stored in the digital memory 20. As the driving modes change during the operation of the carrier, the corresponding stored actual track widths are used for position determination. This stored data can be used so that calibration calculations need only be performed if a new driving mode is used and need not be performed each time the apparatus is placed into operation. Another possibility is to calculate the track width as the apparatus changes driving modes. The information may be stored in the memories 20 for later use. However, preferably, the calibration is performed regularly or when there are indications of changes in the driving mode.

Figure 8:
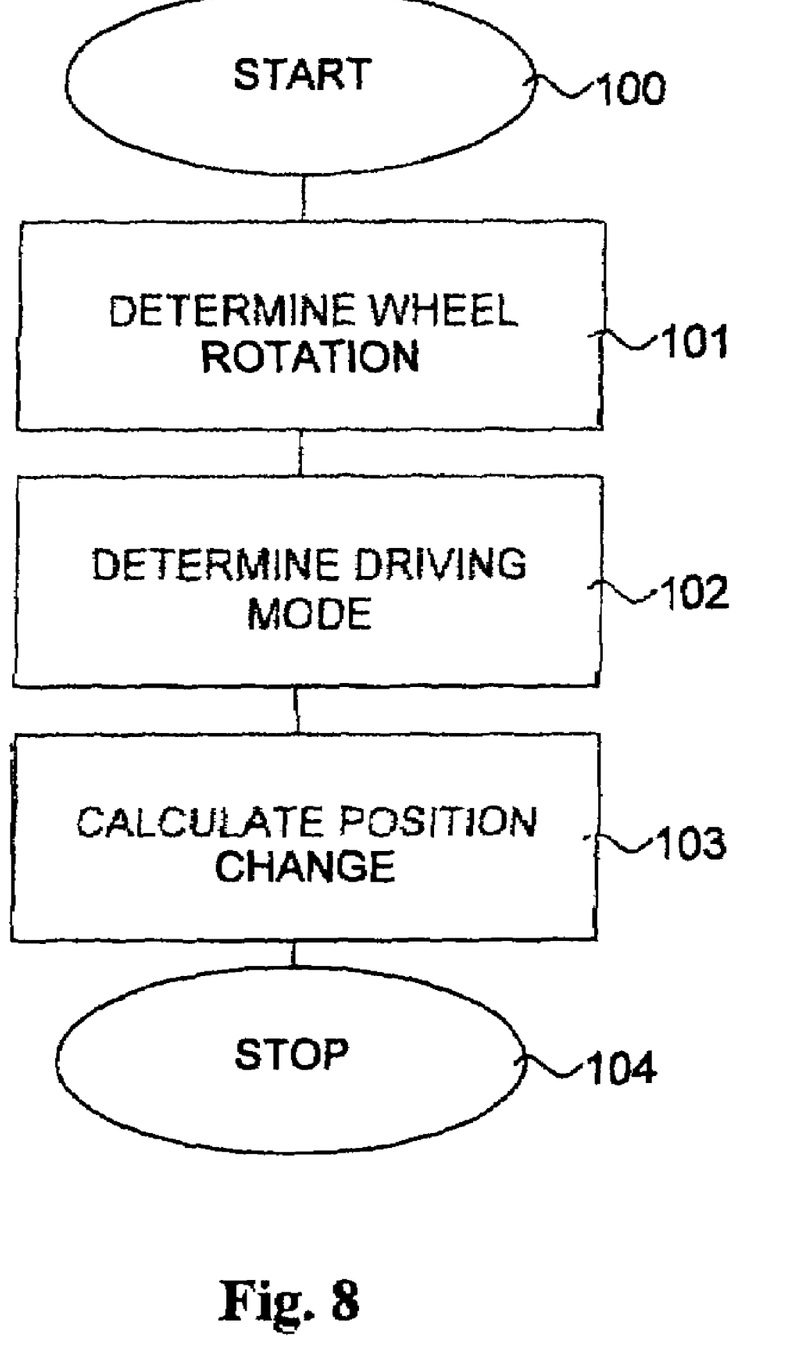
FIG. 8 is a flow diagram of the position determination procedure of the present invention.

FIG. 8 is a schematic flow diagram that illustrates the position determination method of the present invention. The method starts in step 100. In step 101, the distance each of the two driving wheels has traveled is determined. In step 102, a driving mode is determined, based on the ratio of the distances each wheel has traveled. In step 103, the position change that has occurred since the previous calculation is calculated, based on the actual track width that corresponds to the driving mode that has been determined to be in effect. The position determination method is then completed (step 104).

Figure 9A:
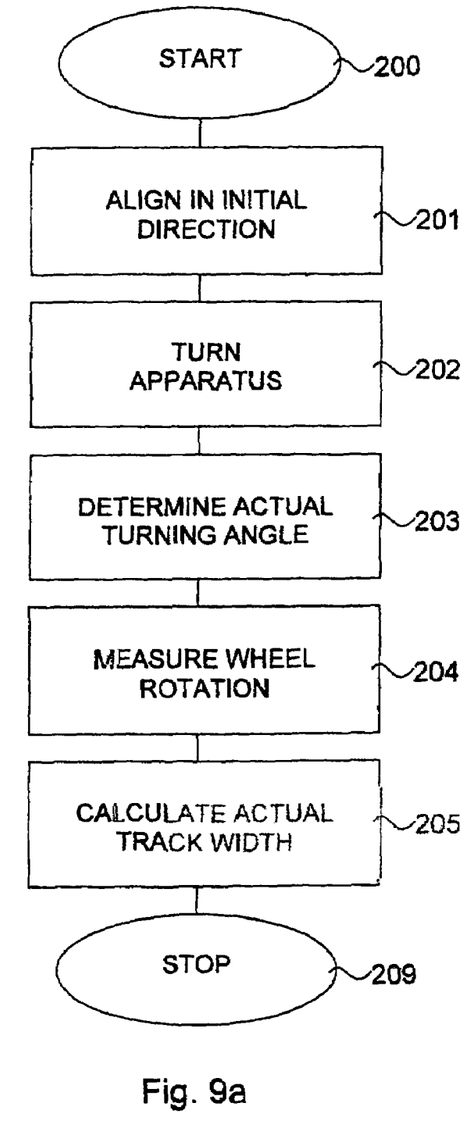
FIGS. 9a and 9b are flow diagrams of the calibration procedure of the present invention.
Figure 9B:
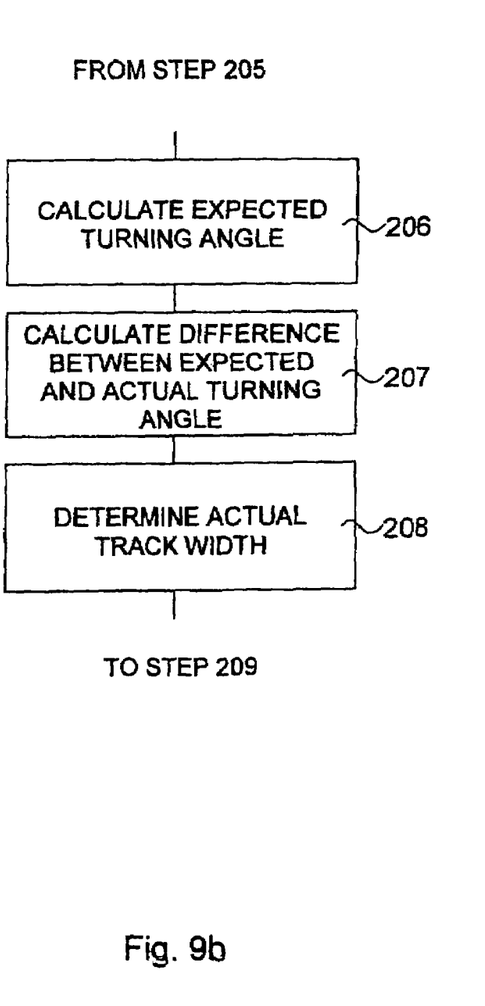

The calibration method of the present invention is briefly described in FIGS. 9a and 9b. The calibration procedure starts in step 200. In step 201, the apparatus is aligned in an initial direction selected by the operator or established by an external or internal input. The apparatus is then, in step 202, caused to turn, in a selected driving mode. The actual turning angle is determined in step 203, using an external or internal reference. In step 204, the corresponding wheel rotations are registered, preferably, by encoders for each wheel. The actual track width of the selected driving mode is calculated in step 205, and the procedure is completed in step 209.

FIG. 9b describes in more detail a preferred manner of accomplishing the calculation of step 205. In step 206, an expected turning angle is calculated based on the wheel rotations and an assumed track width. The calculation continues in step 207, where the difference between the actual and the expected turning angles is determined. In step 208, the actual track width is calculated as a correction to the assumed track width, applying the difference determined in step 207. Finally, the procedure is concluded in step 209.

It will be understood by a person skilled in the art that various modifications and changes may be made to the present invention without departing from the scope thereof, which is defined by the appended claims.

The invention claimed is:

1. A method of determining the state of a carrier on a field of operation, the carrier having means comprising two oppositely disposed motive units for transporting it over the field of operation, the method comprising the steps of:
employing an actual track width of the motive units as a determinant, at least in part, of the state of the carrier,
relating one or more potential driving modes for the carrier to respective actual track widths that result when the carrier operates in those modes,
determining the driving mode in which the carrier is operating at the time its state is to be determined,
applying the actual track width that corresponds to that driving mode in determining the state of the carrier, and
using the state of the carrier for controlling an operation of the carrier.

2. The method of claim 1 wherein the motive units comprise wheels that are arranged to be driven independently of one another.

3. The method of claim 2 wherein a driving mode employed is defined by the overlap of a range of rotational velocities for each wheel.

4. The method of claim 2 wherein a driving mode employed is defined by a range of rotational velocities for only one of the wheels.

5. The method of claim 2 wherein a driving mode employed is defined by a single ratio between the rotational velocities of the two wheels.

6. The method of claim 2 wherein a driving mode employed is defined by a range of ratios between the rotational velocities of the two wheels.

7. The method of claim 2 wherein five driving modes are employed, a first mode being defined by both wheels having equal rotational velocities in a direction tending to move the carrier in a forward direction, second and third modes being defined, respectively, by the rotation of one wheel in one direction or the other and the rotation of the other wheel in the opposite direction at the same rotational velocities, and a fourth and fifth modes being defined, respectively, by the rotation at one rotational velocity of one or the other of the wheels in a direction tending to move the carrier forward either alone or together with the rotation in the same direction at a lower rotational velocity of the other of the wheels.

8. The method of claim 1 wherein the state of the carrier to be determined is the position of the carrier on the field of operation.

9. The method of claim 8 wherein the carrier is an autonomous vacuum cleaner.

10. The method of claim 9 wherein the motive units comprise wheels that are arranged to be driving independently of one another.

11. The method of claim 10 wherein a driving mode employed is defined by the overlap of a range of rotational velocities for each wheel.

12. The method of claim 10 wherein a driving mode employed is defined by a range of rotational velocities for only one of the wheels.

13. The method of claim 10 wherein a driving mode employed is defined by a single ratio between the rotational velocities of the two wheels.

14. The method of claim 10 wherein a driving mode employed is defined by a range of ratios between the rotational velocities of the two wheels.

15. The method of claim 10 wherein five driving modes are employed, a first mode being defined by both wheels having equal rotational velocities in a direction tending to move the carrier in a forward direction, second and third modes being defined, respectively, by the rotation of one wheel in one direction or the other and the rotation of the other wheel in the opposite direction at the same rotational velocities, and a fourth and fifth modes being defined, respectively, by the rotation at one rotational velocity of one or the other of the wheels in a direction tending to move the carrier forward either alone or together with the rotation in the same direction at a lower rotational velocity of the other of the wheels.

16. The method of claim 2 wherein the procedure of relating potential driving modes to actual track widths that result when the carrier operates in those modes includes the steps of aligning the carrier in an initial known direction, driving the carrier in accordance with a driving mode, determining the angle through which the carrier has turned while being driven in that driving mode, determining the distance each of the wheels has traveled while the carrier turned through that angle, and calculating the actual track width for that driving mode based on the distance and angle determinations.

17. The method of claim 16 wherein said calculating step comprises calculating an approximate angle through which it is estimated the carrier has turned based on the distance determinations for the wheels and an assumed track width, calculating the difference between the approximate angle and the determined angle, and calculating the actual track width as a correction to the assumed track width based on that difference.

18. The method of claim 16 wherein the state of the carrier to be determined is the position of the carrier on the field.

19. The method of claim 18 wherein the carrier is an autonomous vacuum cleaner.

20. The method of claim 19 wherein a driving mode employed is defined by the overlap of a range of rotational velocities for each wheel.

21. The method of claim 19 wherein a driving mode employed is defined by a range of rotational velocities for only one of the wheels.

22. The method of claim 19 wherein a driving mode employed is defined by a single ratio between the rotational velocities of the two wheels.

23. The method of claim 19 wherein a driving mode employed is defined by a range of ratios between the rotational velocities of the two wheels.

24. The method of claim 1, wherein the operation of the carrier includes the operation of at least one of the motive units.

25. A carrier having means comprising two oppositely disposed motive units for transporting the carrier over a field of operation, the carrier having the capability of operating in one or more driving modes, means for determining the driving mode of the carrier, and means for calculating the position of the carrier on the field of operation based on an actual track width of the motive units that corresponds to the driving mode that has been determined and the respective distances the motive units have moved.

26. The carrier of claim 25 wherein the carrier comprises an autonomous vacuum cleaner.

27. The carrier of claim 25 wherein the motive units comprise wheels that are arranged to be driven independently of one another.

28. The carrier of claim 27 wherein the carrier comprises an autonomous vacuum cleaner.

29. The carrier of claim 25 and including means for aligning the carrier in a known direction, means for determining the angle through which the carrier turns when operating in a driving mode, and means for calculating an actual track width associated with that driving mode based on the angle through which the carrier turns and the respective distances the motive units move when the carrier moves through that angle.

30. The carrier of claim 29 wherein the carrier comprises an autonomous vacuum cleaner.

31. The carrier of claim 29 wherein the motive means comprises wheels that are arranged to be driven independently of one another.

32. The carrier of claim 31 wherein the carrier comprises an autonomous vacuum cleaner.

33. A method of transporting a carrier on a field of operation, the carrier having means comprising two oppositely disposed motive units for transporting it over the field of operation, the method comprising the steps of:
employing an actual track width of the motive units as a determinant, at least in part, of the state of the carrier,
relating one or more potential driving modes for the carrier to respective actual track widths that result when the carrier operates in those modes,
determining the driving mode in which the carrier is operating at the time its state is to be determined,
applying the actual track width that corresponds to that driving mode in determining the state of the carrier, and
using the state of the carrier for controlling an operation of the carrier.

34. The method of claim 33, wherein the operation of the carrier includes the operation of at least one of the motive units.

* * * * *